US012626619B2

(12) United States Patent
Murata et al.

(10) Patent No.: US 12,626,619 B2
(45) Date of Patent: May 12, 2026

(54) DISPLAY METHOD, DISPLAY CONTROL DEVICE, AND DISPLAY CONTROL SYSTEM

(71) Applicant: TOYOTA JIDOSHA KABUSHIKI KAISHA, Toyota (JP)

(72) Inventors: Soshiro Murata, Toyota (JP); Hiroshi Umeno, Nisshin (JP); Takahiro Nomura, Okazaki (JP); Yuya Onozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 138 days.

(21) Appl. No.: 18/514,437

(22) Filed: Nov. 20, 2023

(65) Prior Publication Data

US 2024/0185747 A1      Jun. 6, 2024

(30) Foreign Application Priority Data

Dec. 5, 2022      (JP) ................................. 2022-194363

(51) Int. Cl.
| | |
|---|---|
| *G09F 21/04* | (2006.01) |
| *B60K 35/00* | (2024.01) |
| *B60K 35/22* | (2024.01) |
| *B60K 35/28* | (2024.01) |
| *B60K 35/29* | (2024.01) |

(52) U.S. Cl.
CPC ............ *G09F 21/049* (2020.05); *B60K 35/00* (2013.01); *B60K 35/22* (2024.01); *B60K 35/28* (2024.01); *B60K 35/29* (2024.01); *B60K 2360/165* (2024.01); *B60K 2360/175* (2024.01); *B60K 2360/178* (2024.01); *B60K 2360/1876* (2024.01); *B60Y 2200/112* (2013.01); *B60Y 2200/91* (2013.01)

(58) Field of Classification Search
CPC ....... G09F 21/049; G09F 19/00; B60K 35/00; B60K 35/22; B60K 35/28; B60K 35/29; B60K 2360/165; B60K 2360/175; B60K 2360/178; B60K 2360/1876; B60Y 2200/112; B60Y 2200/91; B60L 2260/32; B60L 53/305; B60L 2250/16; B60L 53/80; B60L 53/60; B60R 1/22; B60R 2300/80; Y02T 90/12
See application file for complete search history.

(56) References Cited

U.S. PATENT DOCUMENTS

| | | | |
|---|---|---|---|
| 2010/0141206 A1 | 6/2010 | Agassi et al. | |
| 2011/0191186 A1 | 8/2011 | Levy et al. | |
| 2011/0204847 A1 | 8/2011 | Turner | |
| 2019/0202415 A1* | 7/2019 | Lai ....................... | G06Q 10/025 |
| 2020/0164760 A1 | 5/2020 | Sohmshetty et al. | |
| 2022/0169144 A1* | 6/2022 | Kai ......................... | B60L 53/80 |

FOREIGN PATENT DOCUMENTS

| | | |
|---|---|---|
| CN | 113352933 A | 9/2021 |
| JP | 2012-192782 A | 10/2012 |
| JP | 2014-003803 A | 1/2014 |
| WO | 2022/143925 A1 | 7/2022 |

* cited by examiner

*Primary Examiner* — Nathan J Flynn
*Assistant Examiner* — Christine A Kurien
(74) *Attorney, Agent, or Firm* — Dinsmore & Shohl LLP

(57) ABSTRACT

A display method includes displaying an advertisement (predetermined video) on a navigation system (display device) of an electrically powered vehicle in response to detection of performance, by a user, of an operation for causing the electrically powered vehicle to be autonomously parked in a battery station (battery replacement station).

14 Claims, 12 Drawing Sheets

202

202a

START AUTONOMOUS PARKING

202

202b

PLEASE DO NOT LEAVE VEHICLE DURING BATTERY REPLACEMENT

2

1

DISPLAY METHOD, DISPLAY CONTROL DEVICE, AND DISPLAY CONTROL SYSTEM

CROSS REFERENCE TO RELATED APPLICATIONS

This nonprovisional application is based on Japanese Patent Application No. 2022-194363 filed on Dec. 5, 2022 with the Japan Patent Office, the entire contents of which are hereby incorporated by reference.

BACKGROUND

Field

The present disclosure relates to a display method, a display control device, and a display control system.

Description of the Background Art

Japanese Patent Laying-Open No. 2012-192782 discloses a battery replacement apparatus that replaces a battery unit of an electric car.

SUMMARY

During a process of battery replacement by the battery replacement apparatus (battery replacement station) as disclosed in Japanese Patent Laying-Open No. 2012-192782, a predetermined video that can be viewed by a user of the electric car (electrically powered vehicle) is sometimes displayed. However, because a timing of display of the predetermined video is not set, the predetermined video is sometimes displayed at a timing that is difficult for the user to perform viewing (such as when display is performed immediately before exit from the battery replacement apparatus). Accordingly, viewing of the predetermined video during the process of battery replacement is desired to be facilitated.

The present disclosure has been made to solve the problem described above, and is aimed at providing a display method, a display control device, and a display control system that are capable of facilitating viewing of a predetermined video during a process of battery replacement.

A display method according to a first aspect of the present disclosure includes detecting performance of a predetermined process related to battery replacement in a battery replacement station including a battery that is to replace a battery of an electrically powered vehicle, the battery of the electrically powered vehicle being a first battery, the battery included in the battery replacement station being a second battery; and displaying a predetermined video on a display device in response to detection of performance of the predetermined process.

As described above, with the display method according to the first aspect of the present disclosure, a predetermined video is displayed on the display device in response to detection of performance of the predetermined process. Accordingly, a timing of display of a predetermined video on the display device may be easily controlled. As a result, viewing of the predetermined video during a process of battery replacement may be facilitated. Furthermore, the predetermined video may be displayed without a user himself/herself performing an operation for displaying the predetermined video, and a burden on the user may be eliminated.

In some embodiments, with the display method according to the first aspect, the detecting includes detecting performance, by a user of the electrically powered vehicle, of an operation for causing the electrically powered vehicle to be autonomously parked in the battery replacement station. The displaying includes displaying the predetermined video on the display device in response to detection of performance, by the user, of the operation for causing the electrically powered vehicle to be autonomously parked in the battery replacement station. According to such a configuration, the predetermined video may be viewed during autonomous parking of the electrically powered vehicle.

In some embodiments, there are further included detecting completion of autonomous parking of the electrically powered vehicle in the battery replacement station; and stopping display of the predetermined video on the display device in response to detection of completion of autonomous parking of the electrically powered vehicle in the battery replacement station. According to such a configuration, the predetermined video is stopped without the user himself/herself performing an operation for stopping the predetermined video, and thus, the burden of the user may be better eliminated.

In some embodiments, with the display method according to the first aspect, the detecting includes detecting completion of parking of the electrically powered vehicle in the battery replacement station. The displaying includes starting display of the predetermined video on the display device in response to detection of completion of parking of the electrically powered vehicle in the battery replacement station. According to such a configuration, the predetermined video may be viewed after completion of autonomous parking of the electrically powered vehicle.

In some embodiments, the displaying includes displaying the predetermined video and a selection portion that receives an operation for starting the battery replacement on a same screen on the display device, in response to detection of completion of parking of the electrically powered vehicle in the battery replacement station. According to such a configuration, an operation for starting battery replacement may be performed while viewing of the predetermined video is being performed, after autonomous parking of the electrically powered vehicle is completed.

In some embodiments, with the display method according to the first aspect, the detecting includes detecting entrance of the electrically powered vehicle into the battery replacement station. The displaying includes starting display of the predetermined video on the display device in response to detection of entrance of the electrically powered vehicle into the battery replacement station. According to such a configuration, the predetermined video may be viewed inside the battery replacement station.

In some embodiments, with the display method according to the first aspect, the detecting includes detecting performance, by a user of the electrically powered vehicle, of an operation for starting the battery replacement. The displaying includes starting display of the predetermined video on the display device in response to detection of performance, by the user, of the operation for starting the battery replacement. According to such a configuration, the predetermined video may be viewed during performance of a battery replacement task.

In some embodiments, with the display method according to the first aspect, there is further included displaying a notice regarding the battery replacement on the display device before the battery replacement is started. The displaying includes displaying the predetermined video on the display device after the notice is displayed. According to such a configuration, the user may be made to view the notice before viewing the predetermined video. As a result, compared with a case where the predetermined video and the notice are displayed on the same screen, the user may be reliably made to view (read) the notice.

In some embodiments, with the display method according to the first aspect, there are further included detecting completion of the battery replacement; and stopping display of the predetermined video on the display device in response to detection of completion of the battery replacement. According to such a configuration, display of the predetermined video may be prevented from being continued after completion of battery replacement.

In some embodiments, with the display method according to the first aspect, there are further included acquiring user information about a user of the electrically powered vehicle; and determining the predetermined video based on the user information. According to such a configuration, a predetermined video suitable for the user may be displayed.

In some embodiments, with the display method according to the first aspect, there is further included determining the predetermined video based on information about the second battery. According to such a configuration, information about the second battery may be acquired by viewing the predetermined video.

In some embodiments, with the display method according to the first aspect, the displaying includes displaying, on the display device, an advertisement about a facility in proximity of the battery replacement station, based on position information of the battery replacement station. According to such a configuration, information about a facility in proximity of the battery replacement station may be acquired by viewing the predetermined video.

A display control device according to a second aspect of the present disclosure includes a communication unit that communicates with at least one of an electrically powered vehicle where a first battery is mounted, and a battery replacement station including a second battery that is to replace the first battery. The display control device includes a controller that detects performance of a predetermined process related to battery replacement in the battery replacement station, and that performs control of causing a display device to display a predetermined video, in response to detection of performance of the predetermined process.

As described above, with the display control device according to the second aspect of the present disclosure, a predetermined video is displayed on the display device in response to detection of performance of the predetermined process. Accordingly, there may be provided a display control device that can facilitate viewing of a predetermined video during a process of battery replacement.

A display control system according to a third aspect of the present disclosure includes a first processing device that performs a process of battery replacement in a battery replacement station including a battery that is to replace a battery of an electrically powered vehicle, the battery of the electrically powered vehicle being a first battery, the battery included in the battery replacement station being a second battery, and a second processing device that performs a process of displaying a predetermined video on a display device. The second processing device performs the process of displaying a predetermined video on the display device, in a case where performance of a predetermined process by the first processing device is detected.

As described above, with the display control system according to the third aspect of the present disclosure, a predetermined video is displayed on the display device in response to detection of performance of a predetermined process by the first processing device. Accordingly, there may be provided a display control system that can facilitate viewing of a predetermined video during a process of battery replacement.

The foregoing and other objects, features, aspects and advantages of the disclosure will become more apparent from the following detailed description of the disclosure when taken in conjunction with the accompanying drawings.

DESCRIPTION OF THE EMBODIMENTS

Figure 1:
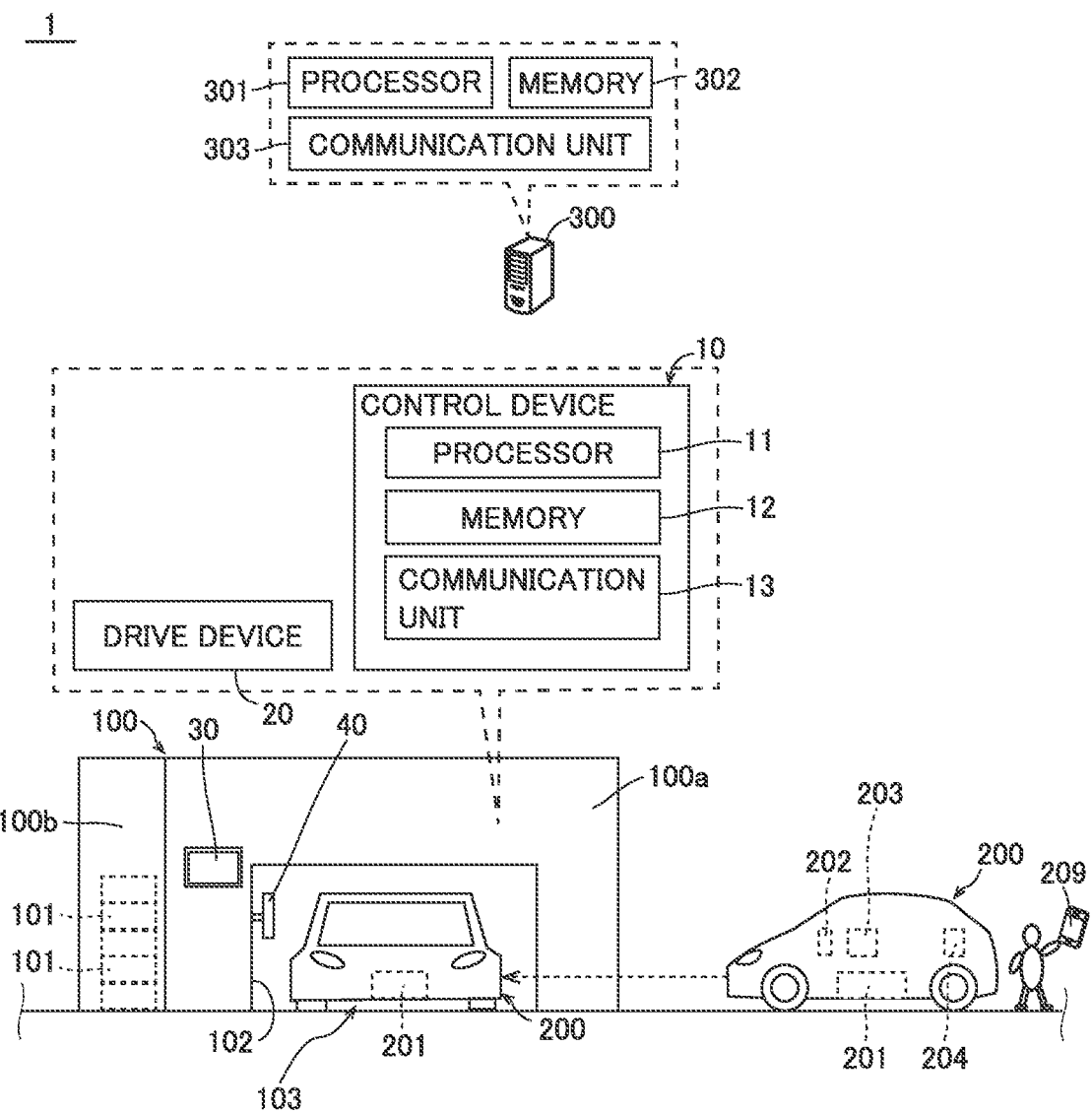
FIG. 1 is a diagram showing a configuration of a display control system according to a first embodiment.

Hereinafter, a first embodiment of the present disclosure will be described in detail with reference to the drawings. Same or corresponding parts in the drawings will be denoted by a same reference sign, and repeated description will be omitted.

First Embodiment (Configuration of Display Control System)

FIG. 1 is a diagram showing a configuration of a display control system 1 according to the first embodiment. Display control system 1 includes a battery station 100, an electrically powered vehicle 200, and an advertisement management server 300. Additionally, battery station 100 is an example of a "battery replacement station" of the present disclosure. Furthermore, advertisement management server 300 is an example of a "display control device" and a "second processing device" of the present disclosure.

Battery station 100 is an apparatus for replacing a battery 201 attached to electrically powered vehicle 200 with a new battery 101. Battery station 100 includes a battery replacement site 100*a* where battery replacement is performed, and a container chamber 100*b* where battery 101 is housed. Container chamber 100*b* is provided annexed to battery replacement site 100*a*. An entrance 102 for allowing electrically powered vehicle 200 to enter and leave is provided in battery replacement site 100*a*. Additionally, battery 201 and battery 101 are examples of a "first battery" and a "second battery" of the present disclosure.

Battery station 100 includes a control device 10 and a drive device 20. Additionally, drive device 20 is an example of a "first processing device" of the present disclosure.

Control device 10 includes a processor 11, a memory 12, and a communication unit 13. Memory 12 stores, in addition to programs that are executed by processor 11, information that is used by the programs (such as maps, mathematical expressions, and various parameters). Processor 11 controls drive device 20.

Communication unit 13 includes various communication I/Fs. Processor 11 controls communication unit 13. Communication unit 13 communicates with each of electrically powered vehicle 200 and advertisement management server 300. Additionally, communication unit 13 may also communicate with a mobile terminal 209 carried by a user of electrically powered vehicle 200.

Drive device 20 performs a process of battery replacement at battery station 100. More specifically, drive device 20 includes a movement mechanism for finely adjusting a position of electrically powered vehicle 200 to a battery replacement position, a lift mechanism for lifting and lowering electrically powered vehicle 200, a mechanism for performing replacement of battery, and the like. Additionally, in the present specification, detailed description and illustration of each mechanism will not be given.

Furthermore, battery station 100 includes a monitor 30 that is attached to an outside wall of battery station 100. Battery station 100 also includes a monitor 40 that is attached to a wall surface inside battery station 100. A user of electrically powered vehicle 200 is able to view monitor 30 from outside battery station 100. More specifically, the user is able to view monitor 30 from inside the vehicle outside battery station 100 during parking of electrically powered vehicle 200 into battery station 100. Moreover, the user of electrically powered vehicle 200 is able to view monitor 40 from inside electrically powered vehicle 200 inside battery station 100.

Advertisement management server 300 is a server that manages distribution of an advertisement that is to be viewed by the user of electrically powered vehicle 200 who is using battery station 100. Advertisement management server 300 is provided separately from battery station 100.

Advertisement management server 300 includes a processor 301, a memory 302, and a communication unit 303. Memory 302 stores, in addition to programs that are executed by processor 301, information that is used by the programs (such as maps, mathematical expressions, and various parameters). Memory 302 also stores position information of battery station 100. Processor 301 controls communication unit 303. Communication unit 303 includes various communication I/Fs. Additionally, processor 301 is an example of a "controller" of the present disclosure.

Electrically powered vehicle 200 includes battery 201, a navigation system 202, an electronic control unit (ECU) 203, and a communication device 204. Additionally, navigation system 202 is an example of a "display device" of the present disclosure.

Battery 201 supplies power to various electrical appliances such as a travel motor, not shown, of electrically powered vehicle 200. ECU 203 controls various electrical appliances of electrically powered vehicle 200 including navigation system 202 and communication device 204. Communication device 204 communicates with advertisement management server 300 and battery station 100.

Furthermore, a vehicle stop region 103 is provided in battery station 100. A battery replacement task is performed in a state where electrically powered vehicle 200 is stopped in vehicle stop region 103.

(Sequential Control of Display Control System)

Figure 2:
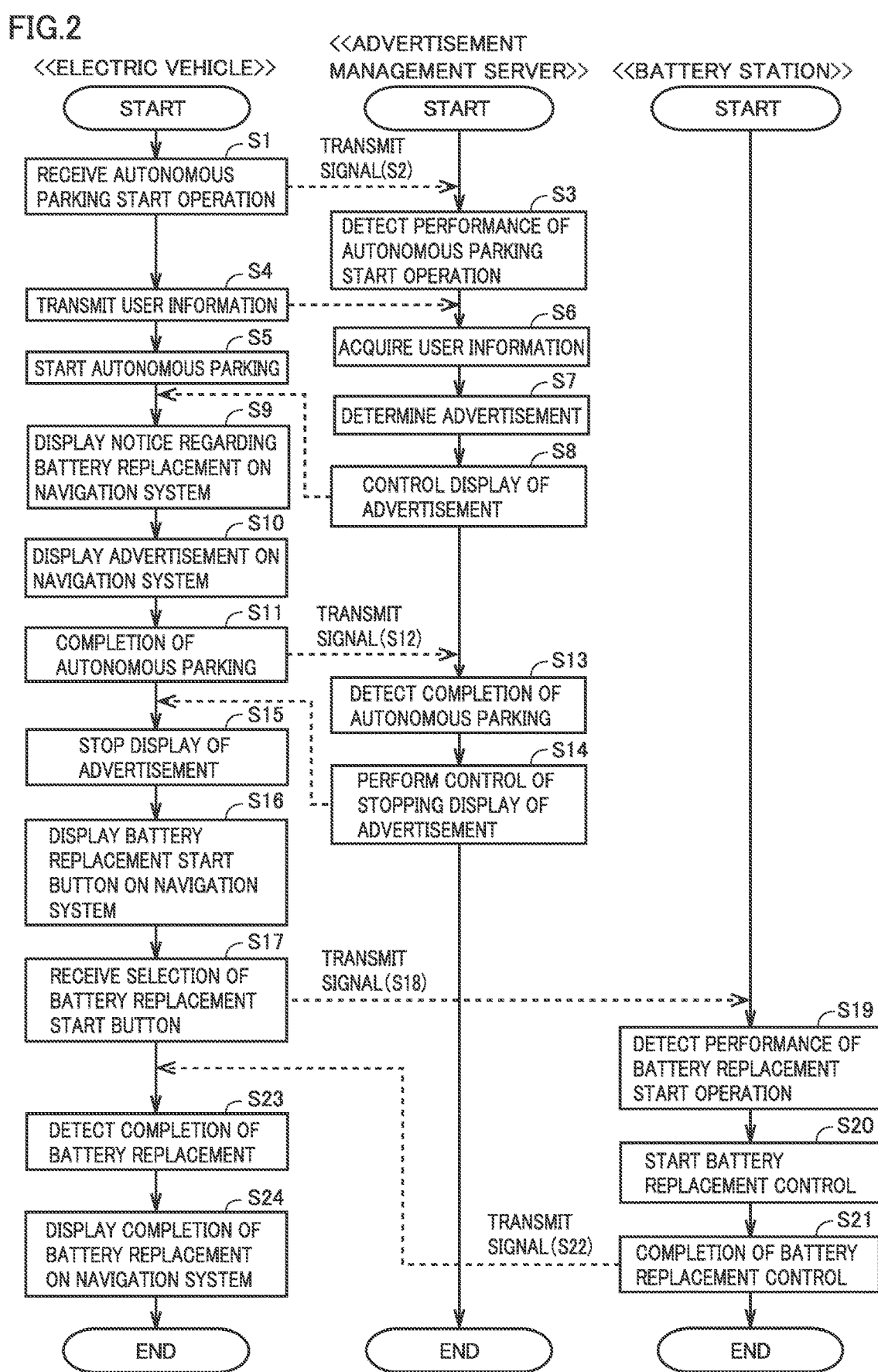
FIG. 2 is a sequence diagram of the display control system according to the first embodiment.

Next, with reference to FIG. 2, sequential control of display control system 1 will be described. Additionally, the example shown in FIG. 2 is merely an example, and an order of processing steps and the like are not limited to the example shown in FIG. 2.

Figures 3, 4:
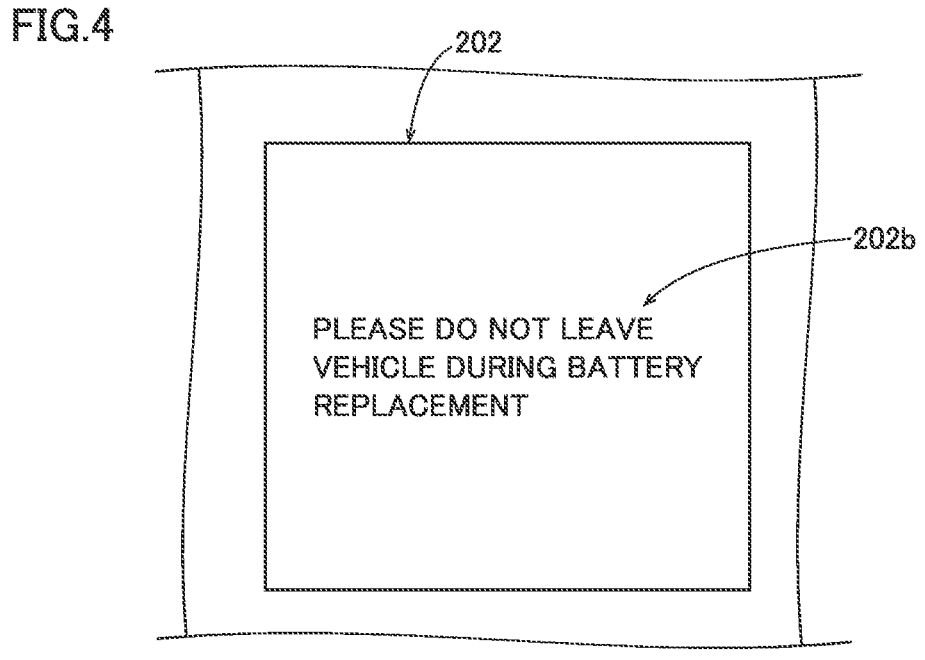
FIG. 3 is a diagram showing a screen of a navigation system where an operation for starting autonomous parking is performed.
FIG. 4 is a diagram showing a screen of the navigation system showing a notice regarding battery replacement.

In step S1, electrically powered vehicle 200 receives an operation by a user for starting autonomous parking in battery station 100. More specifically, the operation for starting autonomous parking is received when a button 202*a* (see FIG. 3) displayed on navigation system 202 is selected (touched) by the user. Additionally, the operation may be performed on mobile terminal 209 of the user.

In step S2, electrically powered vehicle 200 (communication device 204) transmits, to advertisement management server 300, a signal indicating that the operation for starting autonomous parking is received in step S1.

In step S3, by acquiring the signal transmitted from electrically powered vehicle 200 in step S2, advertisement management server 300 (processor 301) detects reception, by electrically powered vehicle 200, of the operation for starting autonomous parking.

In step S4, electrically powered vehicle 200 (communication device 204) transmits information about the user to advertisement management server 300. The information about the user includes information such as age, hobby and the like of the user, for example. Additionally, the process in step S4 may be performed on mobile terminal 209. Moreover, the process in step S4 may be completed before step S1.

In step S5, electrically powered vehicle 200 (ECU 203) starts control of autonomous parking in response to the process in step S1. For example, control of autonomous parking is performed based on an image from a camera, not shown, mounted on electrically powered vehicle 200.

In step S6, advertisement management server 300 (processor 301) acquires the information about the user in response to the process in step S4.

In step S7, advertisement management server 300 (processor 301) determines an advertisement to be distributed to electrically powered vehicle 200, based on the information about the user acquired in step S6.

In step S8, advertisement management server 300 (processor 301) performs control of causing navigation system 202 to display the advertisement determined in step S7, in response to detection in step S3 of performance, by the user, of the operation for causing electrically powered vehicle 200 to perform autonomous parking.

In step S9, electrically powered vehicle 200 (ECU 203) causes navigation system 202 to display a notice regarding battery replacement, in response to control of advertisement display being performed by advertisement management server 300 in step S8. More specifically, electrically powered vehicle 200 displays a message 202*b* (see FIG. 4) indicating a notice regarding battery replacement, on navigation system 202.

Figure 5:
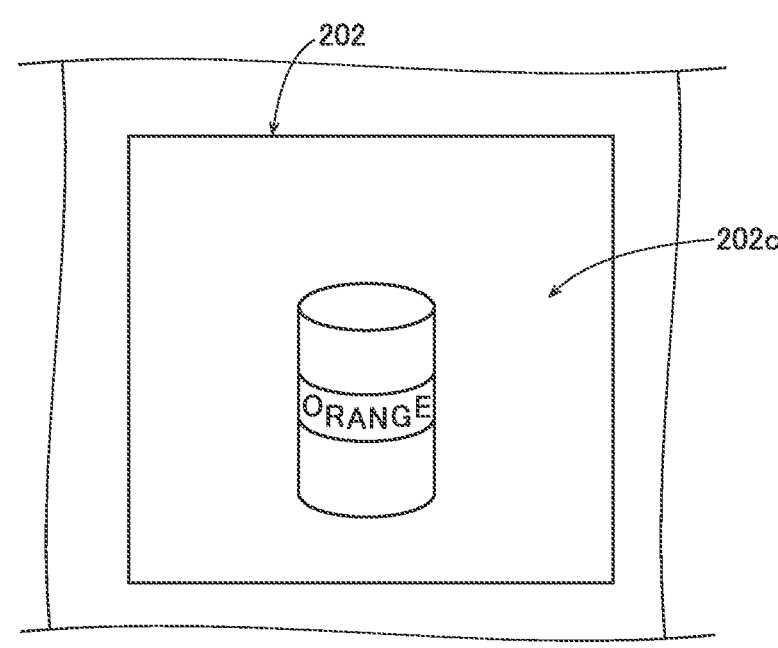
FIG. 5 is a diagram showing an advertisement screen.

In step S10, electrically powered vehicle 200 (ECU 203) causes navigation system 202 to display an advertisement screen 202c (see FIG. 5) based on the advertisement determined in step S7. More specifically, electrically powered vehicle 200 displays advertisement screen 202c after hiding the notice displayed in step S9. Additionally, advertisement screen 202c is an example of a "predetermined video" of the present disclosure.

In step S11, electrically powered vehicle 200 (ECU 203) completes control of autonomous parking in response to detection of parking at a predetermined position inside battery station 100.

In step S12, electrically powered vehicle 200 (communication device 204) transmits a signal indicating completion of autonomous parking to advertisement management server 300.

In step S13, advertisement management server 300 (processor 301) detects completion of autonomous parking of electrically powered vehicle 200 based on the signal transmitted in step S12.

In step S14, advertisement management server 300 (processor 301) performs control of stopping display of the advertisement at electrically powered vehicle 200, in response to detection in step S13 of completion of autonomous parking of electrically powered vehicle 200.

In step S15, electrically powered vehicle 200 (ECU 203) stops display of (hides) advertisement screen 202c displayed on navigation system 202, in response to the process in step S14.

Figure 6:
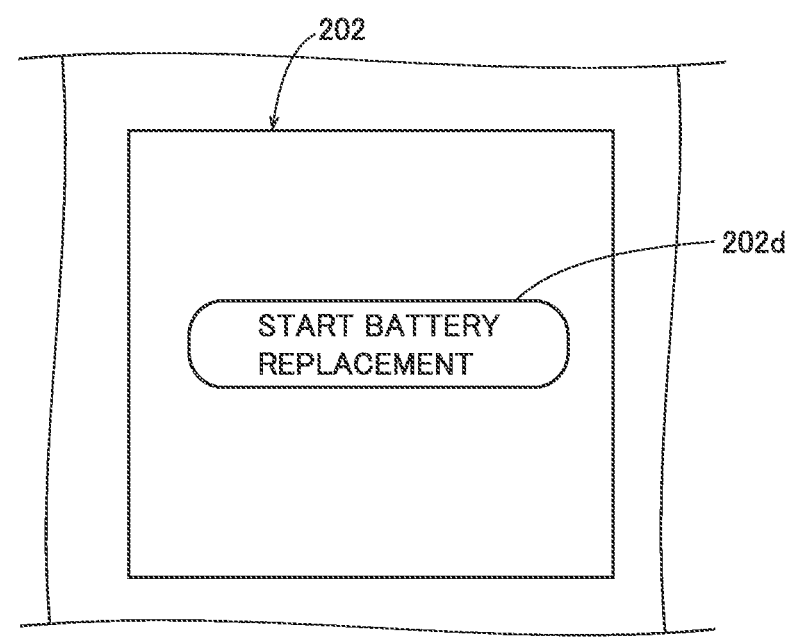
FIG. 6 is a diagram showing a screen of the navigation system where an operation for starting battery replacement is performed.

In step S16, electrically powered vehicle 200 (ECU 203) causes navigation system 202 to display a button 202d (see FIG. 6) for starting battery replacement, in response to advertisement screen 202c on navigation system 202 being hidden in step S15.

In step S17, electrically powered vehicle 200 receives an operation by the user for starting battery replacement. More specifically, the operation for starting battery replacement is received when button 202d displayed on navigation system 202 in step S16 is selected (touched) by the user. Additionally, the operation may be performed on mobile terminal 209 of the user.

In step S18, electrically powered vehicle 200 (communication device 204) transmits, to battery station 100 (communication unit 13), a signal indicating that the operation for starting battery replacement is received in step S17.

In step S19, battery station 100 (processor 11) detects reception of the operation for starting battery replacement at electrically powered vehicle 200, by acquiring the signal transmitted by electrically powered vehicle 200 in step S18.

In step S20, battery station 100 (processor 11) controls drive device 20, and starts battery replacement control.

In step S21, battery station 100 (processor 11) completes battery replacement control in response to detection of completion of battery replacement by drive device 20.

In step S22, battery station 100 (communication unit 13) transmits, to electrically powered vehicle 200 (communication device 204), a signal indicating completion of battery replacement control.

In step S23, electrically powered vehicle 200 (ECU 203) detects completion of battery replacement control, by acquiring the signal transmitted by battery station 100 in step S22.

Figure 7:
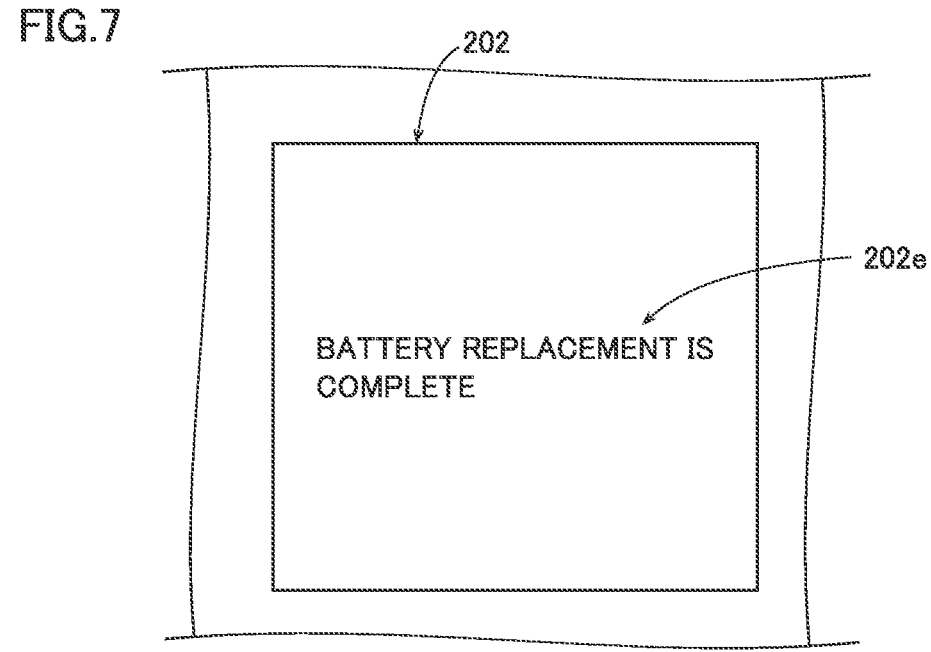
FIG. 7 is a diagram showing a screen displaying a message indicating completion of battery replacement.

In step S24, electrically powered vehicle 200 (ECU 203) causes navigation system 202 to display a message 202e (see FIG. 7) indicating completion of battery replacement.

As described above, in the first embodiment, an advertisement is displayed on navigation system 202 in response to detection of performance, by the user, of the operation for causing electrically powered vehicle 200 to perform autonomous parking in battery station 100. An advertisement may thus be displayed on navigation system 202 at a timing of start of autonomous parking, and the user may reliably view the advertisement during autonomous parking of electrically powered vehicle 200.

Second Embodiment

Next, with reference to FIGS. 8 to 10, a second embodiment of the present disclosure will be described. In the second embodiment, an advertisement is displayed in response to completion of autonomous parking of an electrically powered vehicle 210. Additionally, structures the same as those in the first embodiment will be denoted by same reference signs as in the first embodiment, and redundant description will not be given.

(Configuration of Display Control System)

Figure 8:
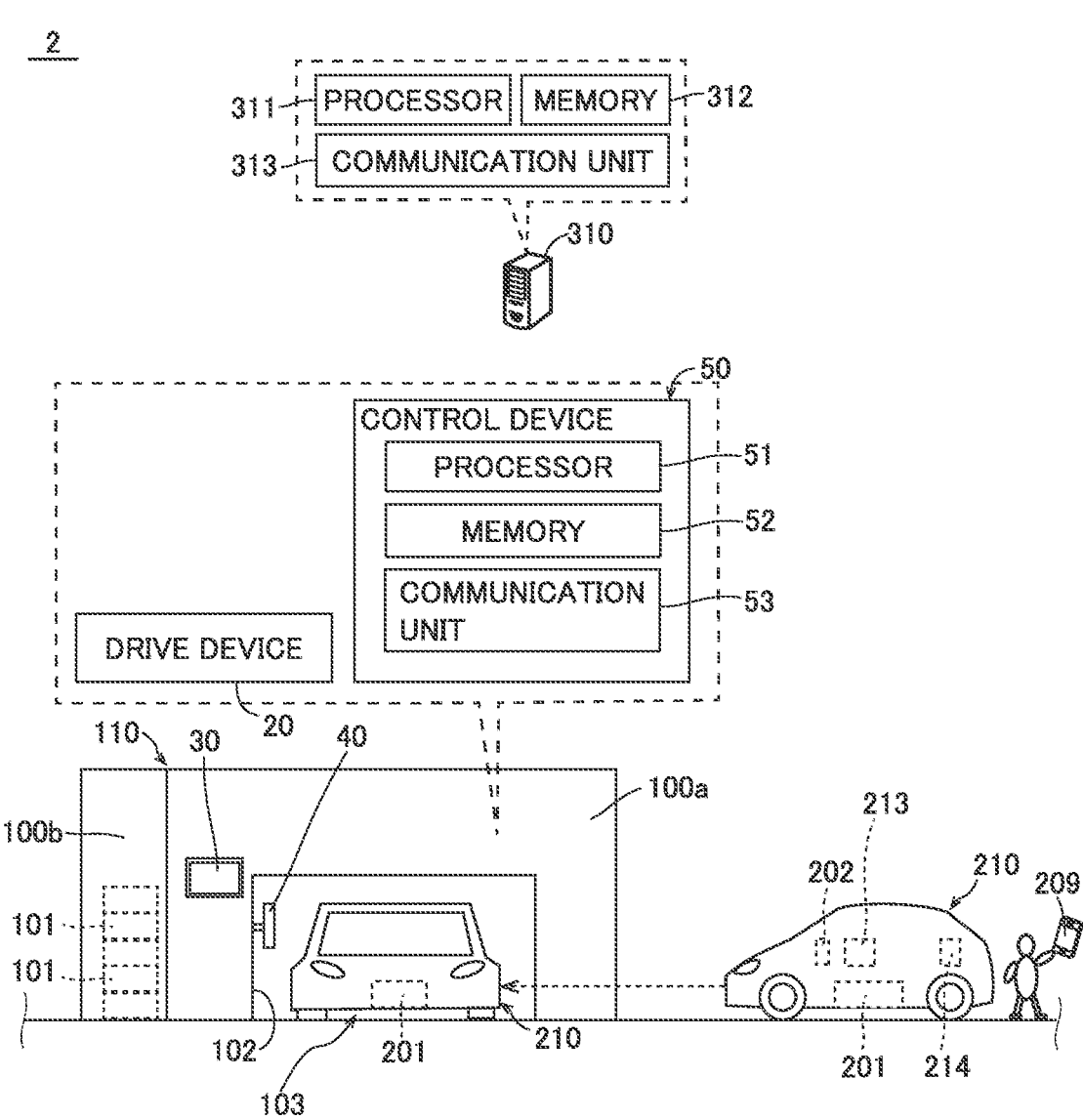
FIG. 8 is a diagram showing a configuration of a display control system according to a second embodiment.
Figure 9:
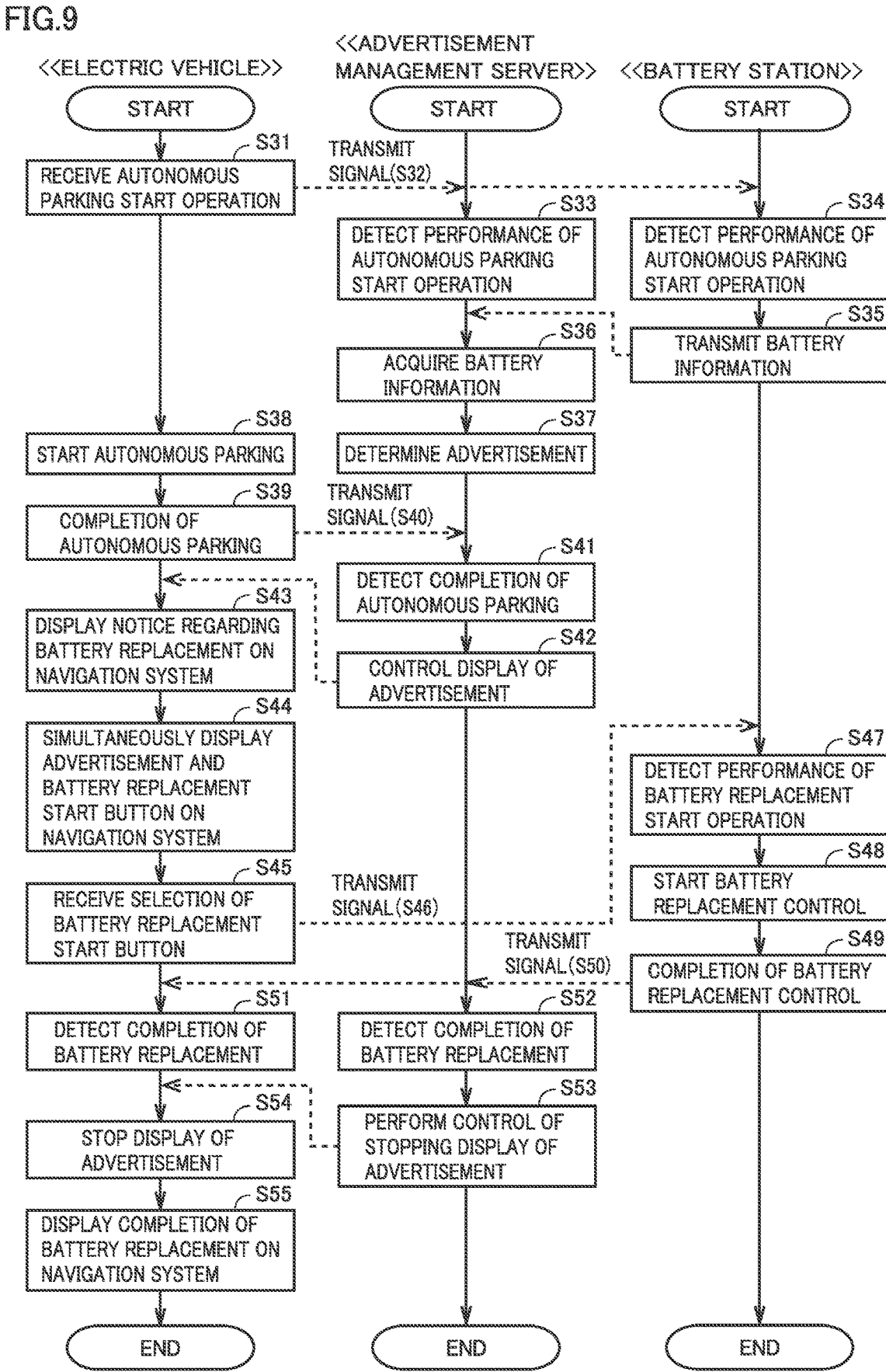
FIG. 9 is a sequence diagram of the display control system according to the second embodiment.

FIG. 8 is a diagram showing a configuration of a display control system 2 according to the second embodiment. Display control system 2 includes a battery station 110, electrically powered vehicle 210, and an advertisement management server 310. Additionally, battery station 110 is an example of the "battery replacement station" of the present disclosure. Furthermore, advertisement management server 310 is an example of the "display control device" and the "second processing device" of the present disclosure.

Battery station 110 includes a control device 50 and drive device 20. Control device 50 includes a processor 51, a memory 52, and a communication unit 53. Memory 52 stores, in addition to programs that are executed by processor 51, information that is used by the programs (such as maps, mathematical expressions, and various parameters). Processor 51 controls drive device 20.

Advertisement management server 310 includes a processor 311, a memory 312, and a communication unit 313. Memory 312 stores, in addition to programs that are executed by processor 311, information that is used by the programs (such as maps, mathematical expressions, and various parameters). Processor 311 controls communication unit 313. Communication unit 313 includes various communication I/Fs. Additionally, processor 311 is an example of the "controller" of the present disclosure.

Electrically powered vehicle 210 includes, in addition to battery 201 and navigation system 202, an ECU 213 and a communication device 214.

(Sequential Control of Display Control System)

Next, with reference to FIG. 9, sequential control of display control system 2 will be described. Additionally, steps in processes the same as those in the first embodiment will not be described in detail.

In step S31, as in step S1 in the first embodiment, electrically powered vehicle 210 receives an operation by a user for starting autonomous parking in battery station 110.

In step S32, electrically powered vehicle 210 (communication device 214) transmits, to each of advertisement management server 310 and battery station 110, a signal indicating that the operation for starting autonomous parking is received in step S31. Additionally, the signal transmitted to battery station 110 may be transmitted to battery station 110 from advertisement management server 310. Furthermore, the signal transmitted to advertisement management server 310 may be transmitted to advertisement management server 310 from battery station 110.

In step S33, as in step S3 in the first embodiment, advertisement management server 310 (processor 311) detects reception, by electrically powered vehicle 210, of the operation for starting autonomous parking.

In step S34, by acquiring the signal transmitted by electrically powered vehicle 210 in step S32, battery station 110 (processor 51) detects reception, by electrically powered vehicle 210, of the operation for starting autonomous parking.

In step S35, in response to the process in step S34, battery station 110 (processor 51) transmits information about battery 101 housed in battery station 110, to advertisement management server 310. The information about battery 101 includes information about a company owning broadcast right for an advertisement, determined for each battery 101.

In step S36, advertisement management server 310 (processor 311) acquires the information about battery 101 in response to the process in step S35.

In step S37, advertisement management server 310 (processor 311) determines an advertisement based on the information about battery 101 (information about a company owning the broadcast right for an advertisement) acquired in step S36. For example, advertisement management server 310 (processor 311) determines distribution of an advertisement of the company.

In step S38, as in step S5 in the first embodiment, electrically powered vehicle 210 (ECU 213) starts control of autonomous parking.

In step S39, as in step S11 in the first embodiment, electrically powered vehicle 210 (ECU 213) completes control of autonomous parking.

In step S40, electrically powered vehicle 210 (communication device 214) transmits a signal indicating completion of autonomous parking to advertisement management server 310.

In step S41, advertisement management server 310 (processor 311) detects completion of autonomous parking of electrically powered vehicle 210, based on the signal acquired in response to the process in step S40.

In step S42, advertisement management server 310 (processor 311) performs control of causing navigation system 202 to display the advertisement determined in step S37, in response to detection in step S41 of completion of autonomous parking of electrically powered vehicle 210.

In step S43, as in step S9 in the first embodiment, electrically powered vehicle 210 (ECU 213) causes navigation system 202 to display a notice regarding battery replacement, in response to the process in step S42.

Figure 10:
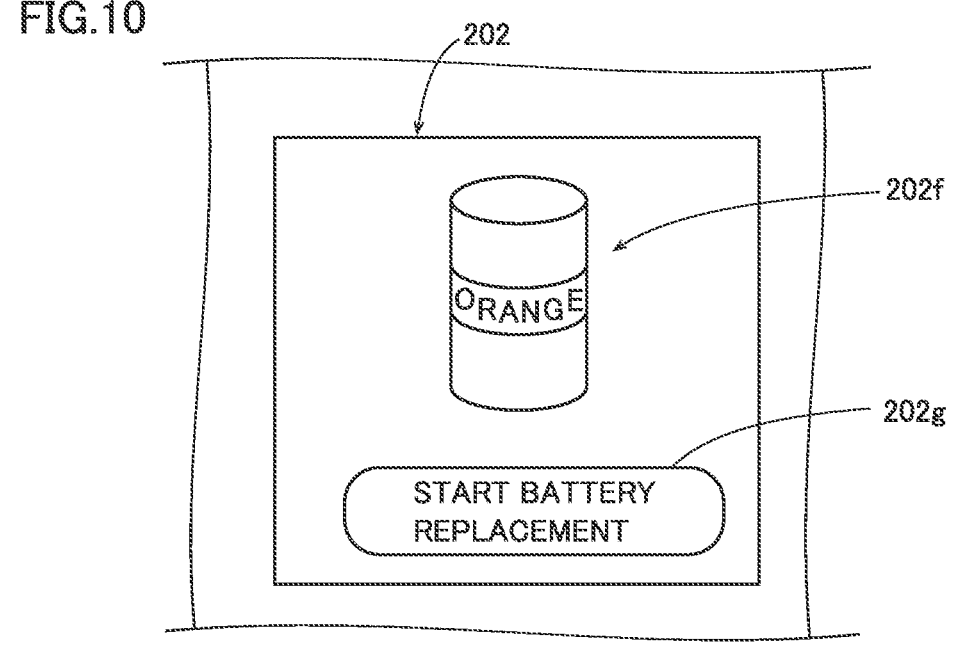
FIG. 10 is a diagram showing a screen displaying an advertisement screen and a button for starting battery replacement.

In step S44, electrically powered vehicle 210 (ECU 213) causes an advertisement screen 202*f* for displaying the advertisement determined in step S37 and a button 202*g* for receiving an operation for starting battery replacement to be displayed on a same screen on navigation system 202 (see FIG. 10). Additionally, button 202*g* is an example of a "selection portion" of the present disclosure. Furthermore, advertisement screen 202*f* is an example of the "predetermined video" of the present disclosure.

In steps S45 to S49, same processes as in steps S17 to S21 in the first embodiment are performed.

In step S50, battery station 110 (communication unit 53) transmits a signal indicating completion of battery replacement control to each of electrically powered vehicle 210 and advertisement management server 310. Additionally, the signal transmitted to advertisement management server 310 may be transmitted to advertisement management server 310 from electrically powered vehicle 210. Furthermore, the signal transmitted to electrically powered vehicle 210 may be transmitted to electrically powered vehicle 210 from advertisement management server 310.

In step S51, electrically powered vehicle 210 (ECU 213) detects completion of battery replacement control by acquiring the signal transmitted from battery station 110 in step S50.

In step S52, advertisement management server 310 (processor 311) detects completion of battery replacement control by acquiring the signal transmitted from battery station 110 in step S50.

In step S53, advertisement management server 310 (processor 311) performs control of stopping display of the advertisement in electrically powered vehicle 210, in response to detection of completion of battery replacement in step S52.

In step S54, electrically powered vehicle 210 (ECU 213) stops display of (hides) advertisement screen 202*f* that is displayed on navigation system 202, in response to the process in step S53.

In step S55, electrically powered vehicle 210 (ECU 213) displays a notice indicating completion of battery replacement on navigation system 202 (see FIG. 7), in response to the process in step S51.

As described above, in the second embodiment, an advertisement is displayed on navigation system 202 in response to detection of completion of autonomous parking. An advertisement may thus be displayed on navigation system 202 at a timing of completion of autonomous parking. As a result, the user may reliably view the advertisement during battery replacement after autonomous parking.

Third Embodiment

Next, with reference to FIGS. 11 and 12, a third embodiment of the present disclosure will be described. In the third embodiment, an advertisement is displayed in response to entrance of an electrically powered vehicle 220 into a battery station 120. Additionally, structures the same as those in the first or second embodiment will be denoted by same reference signs as in the first or second embodiment, and redundant description will be omitted.

(Configuration of Display Control System)

Figure 11:
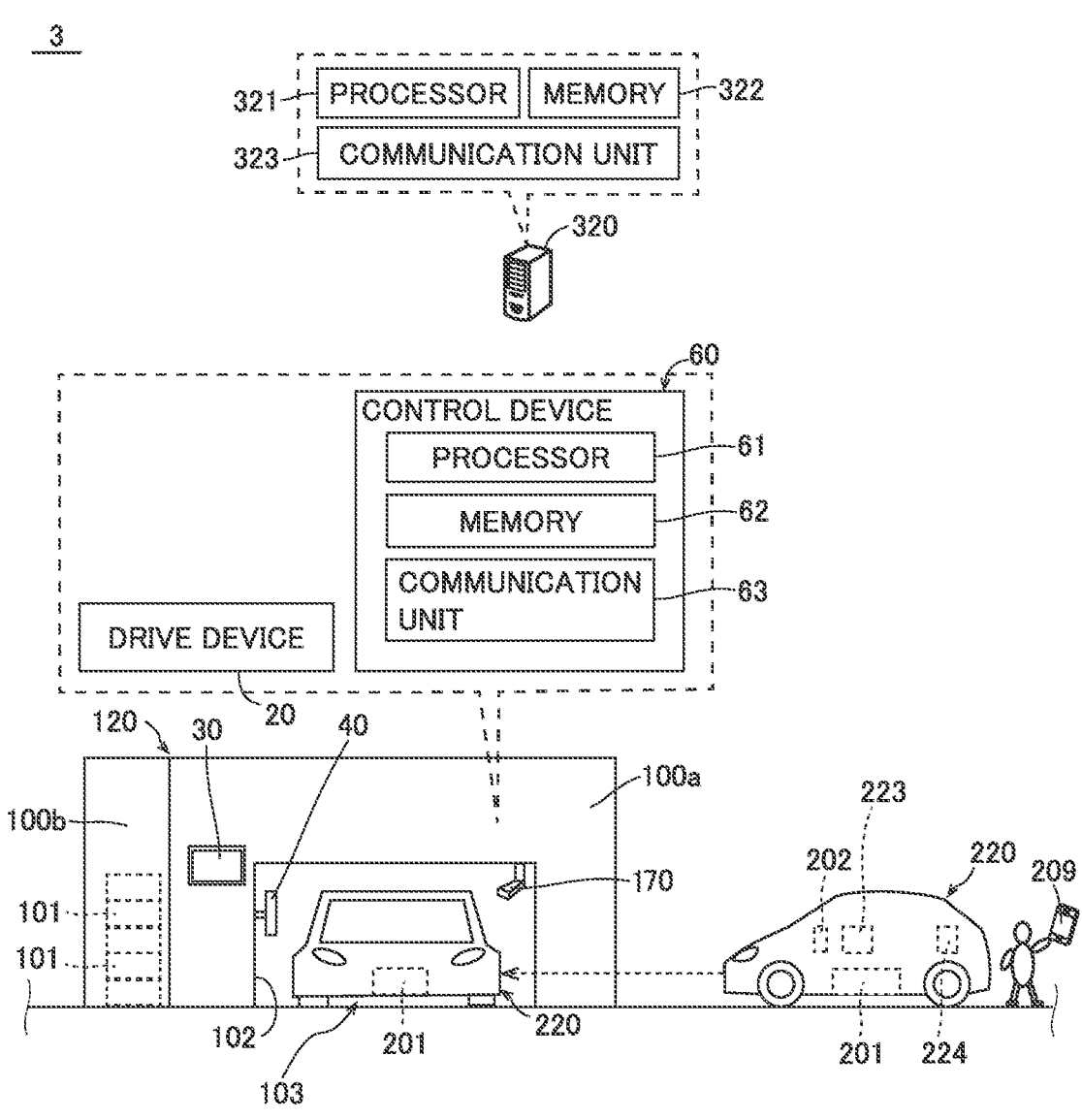
FIG. 11 is a diagram showing a configuration of a display control system according to a third embodiment.
Figure 12:
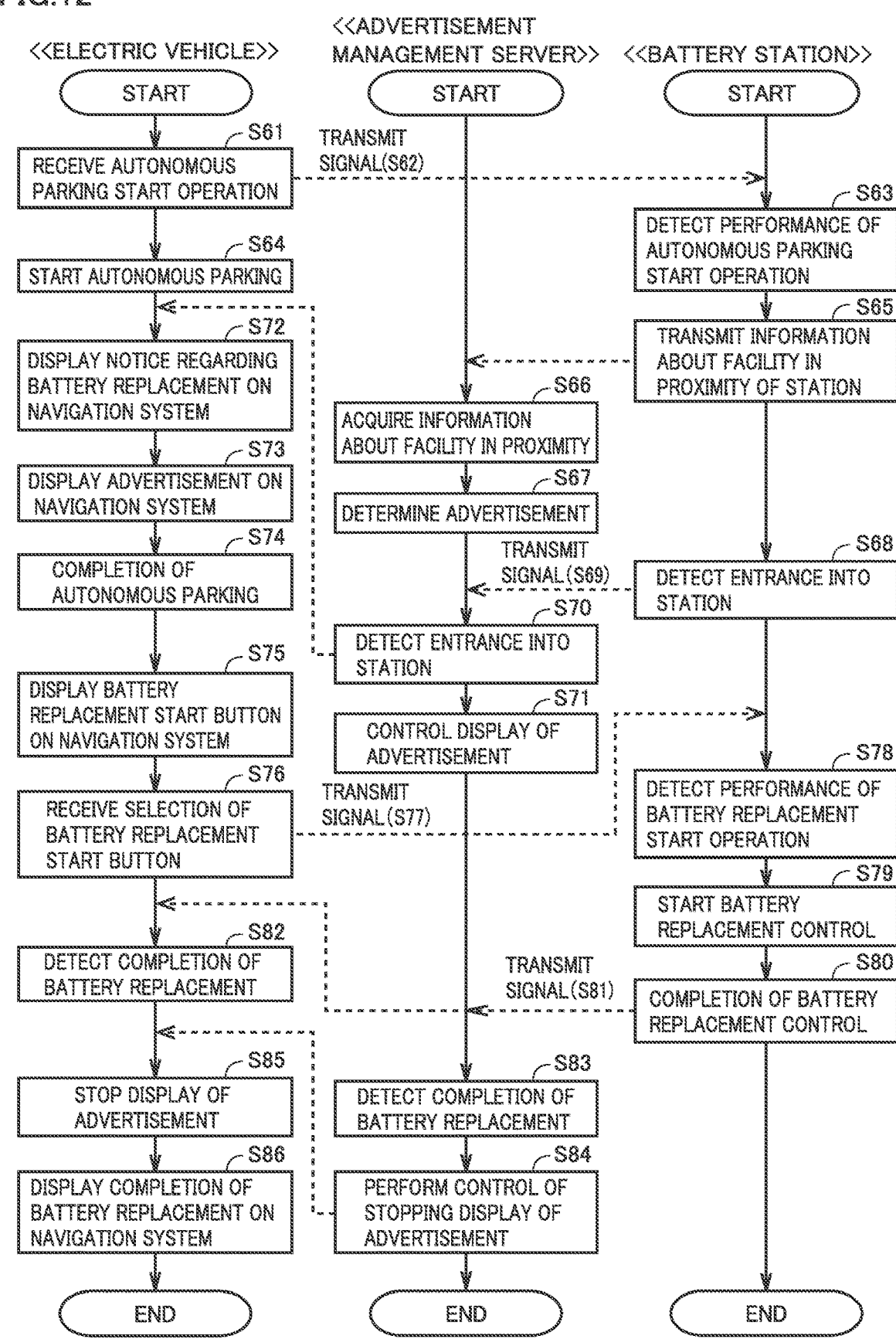
FIG. 12 is a sequence diagram of the display control system according to the third embodiment.

FIG. 11 is a diagram showing a configuration of a display control system 3 according to the third embodiment. Display control system 3 includes battery station 120, electrically powered vehicle 220, and an advertisement management server 320. Additionally, battery station 120 is an example of the "battery replacement station" of the present disclosure. Furthermore, advertisement management server 320 is an example of the "display control device" and the "second processing device" of the present disclosure.

Battery station 120 includes a control device 60, drive device 20, and a camera 170.

Control device 60 includes a processor 61, a memory 62, and a communication unit 63. Memory 62 stores, in addition to programs that are executed by processor 61, information that is used by the programs (such as maps, mathematical expressions, and various parameters). Processor 61 controls drive device 20.

Camera 170 acquires an image of electrically powered vehicle 220 entering battery station 120. Processor 61 detects entrance of electrically powered vehicle 220 into battery station 120 based on the image that is acquired by camera 170.

Advertisement management server 320 includes a processor 321, a memory 322, and a communication unit 323. Memory 322 stores, in addition to programs that are executed by processor 321, information that is used by the programs (such as maps, mathematical expressions, and various parameters). Processor 321 controls communication unit 323. Communication unit 323 includes various communication I/Fs. Additionally, processor 321 is an example of the "controller" of the present disclosure.

Electrically powered vehicle 210 includes, in addition to battery 201 and navigation system 202, an ECU 223 and a communication device 224.

(Sequential Control of Display Control System)

Next, with reference to FIG. 12, sequential control of display control system 3 will be described. Additionally, steps in processes the same as those in the first or second embodiment will not be described in detail.

In step S61, as in step S1 in the first embodiment, electrically powered vehicle 220 receives an operation by a user for starting autonomous parking in battery station 120.

In step S62, electrically powered vehicle 220 (communication device 224) transmits, to battery station 120, a signal indicating that the operation for starting autonomous parking is received in step S61.

In step S63, by acquiring the signal transmitted by electrically powered vehicle 220 in step S62, battery station 120 (processor 61) detects reception, by electrically powered vehicle 220, of the operation for starting autonomous parking.

In step S64, as in step S5 in the first embodiment, electrically powered vehicle 220 (ECU 223) starts control of autonomous parking.

In step S65, battery station 120 (processor 61) transmits, to advertisement management server 320, in response to the process in step S63, information about a facility (such as a restaurant or a convenience store) existing in proximity of battery station 120.

In step S66, advertisement management server 320 (processor 321) acquires the information about a facility in proximity of battery station 120 in response to the process in step S65. Additionally, advertisement management server 320 (processor 321) may acquire the information about a facility in proximity of battery station 120 via the Internet or the like, based on position information of battery station 120 stored in memory 322.

In step S67, advertisement management server 320 (processor 321) determines an advertisement based on the information about a facility in proximity of battery station 120 acquired in step S66. For example, advertisement management server 320 (processor 321) determines distribution of an advertisement of a product that is sold in a store in proximity of battery station 120.

In step S68, battery station 120 (processor 61) detects entrance of electrically powered vehicle 220 into battery station 120 based on an image acquired by camera 170.

In step S69, battery station 120 (communication unit 63) transmits, to advertisement management server 320, a signal indicating entrance of electrically powered vehicle 220 into battery station 120.

In step S70, advertisement management server 320 (processor 321) detects entrance of electrically powered vehicle 220 into battery station 120, based on the signal acquired in response to the process in step S69.

In step S71, advertisement management server 320 (processor 321) performs control of causing navigation system 202 to display the advertisement determined in step S67, in response to detection of entrance of electrically powered vehicle 220 into battery station 120.

In step S72, as in step S9 in the first embodiment, electrically powered vehicle 220 (ECU 223) causes navigation system 202 to display a notice regarding battery replacement.

In step S73, electrically powered vehicle 220 (ECU 223) causes navigation system 202 to display the advertisement determined in step S67.

In step S74, as in step S11 in the first embodiment, electrically powered vehicle 220 (ECU 223) completes control of autonomous parking.

In step S75 to S79, processes the same as in steps S16 to S20 in the first embodiment are performed. Furthermore, in steps S80 to S86, processes the same as in steps S49 to S55 in the second embodiment are performed.

As described above, in the third embodiment, an advertisement is displayed on navigation system 202 in response to detection of entrance of electrically powered vehicle 220 into battery station 120. The user may thereby start viewing the advertisement during autonomous parking.

Fourth Embodiment

Next, with reference to FIGS. 13 and 14, a fourth embodiment of the present disclosure will be described. In the fourth embodiment, an advertisement is displayed in response to an operation for starting battery replacement being performed by the user. Additionally, structures the same as those in the first to third embodiments will be denoted by same reference signs as in the first to third embodiments, and redundant description will be omitted.

(Configuration of Display Control System)

Figure 13:
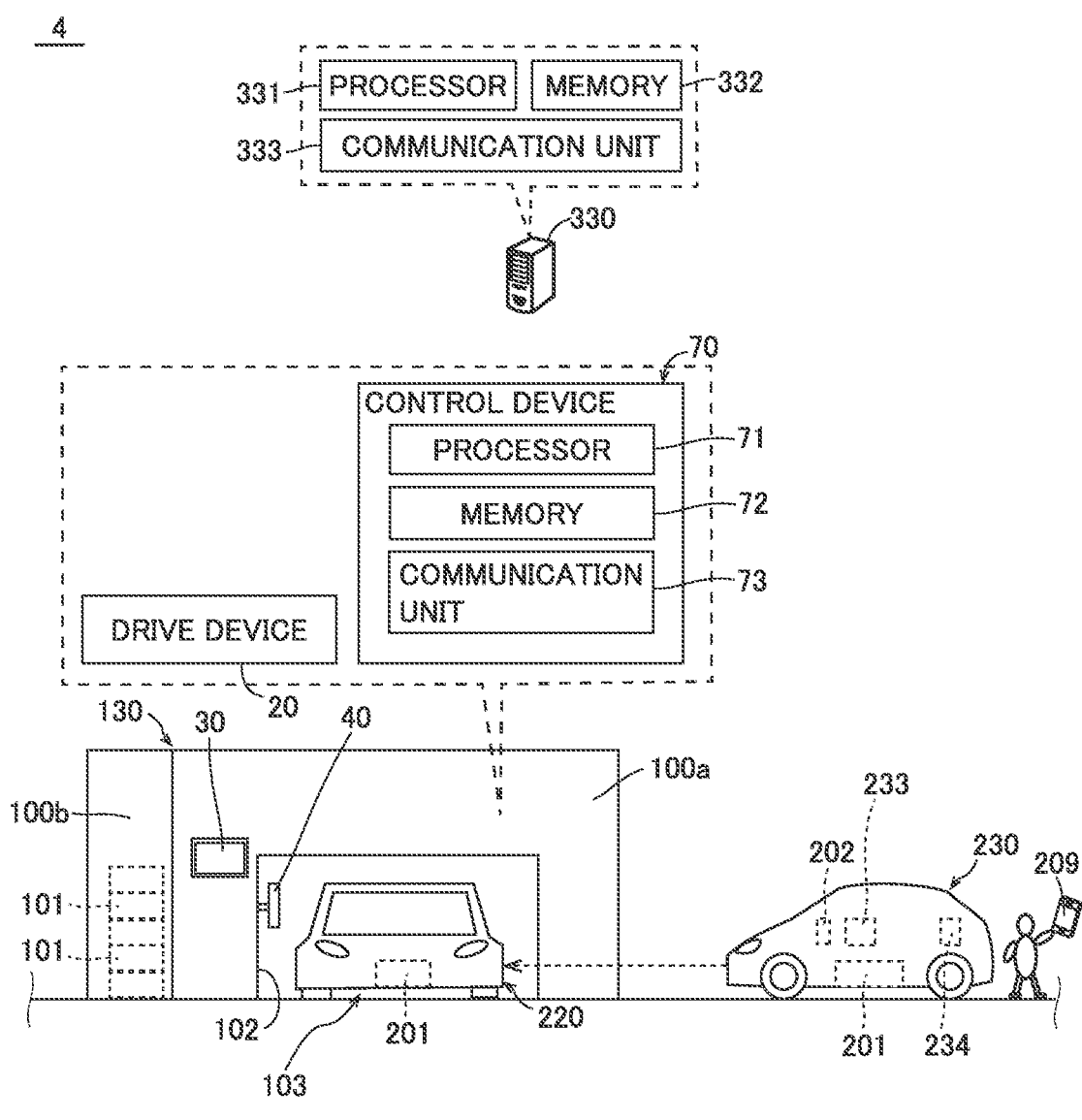
FIG. 13 is a diagram showing a configuration of a display control system according to a fourth embodiment.
Figure 14:
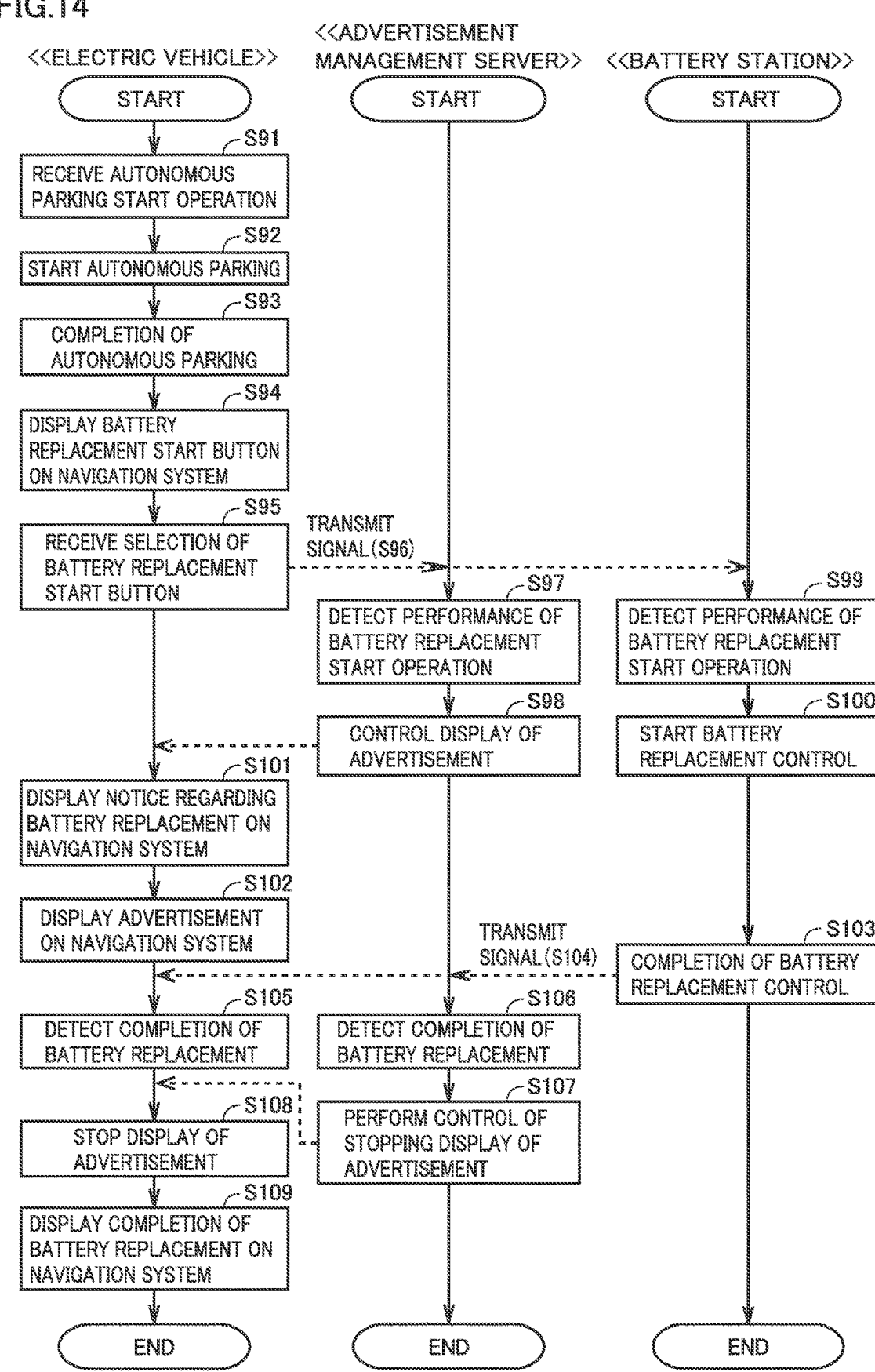
FIG. 14 is a sequence diagram of the display control system according to the fourth embodiment.

FIG. 13 is a diagram showing a configuration of a display control system 4 according to the fourth embodiment. Display control system 4 includes a battery station 130, an electrically powered vehicle 230, and an advertisement management server 330. Additionally, battery station 130 is an example of the "battery replacement station" of the present disclosure. Furthermore, advertisement management server 330 is an example of the "display control device" and the "second processing device" of the present disclosure.

Battery station 130 includes a control device 70 and drive device 20. Control device 70 includes a processor 71, a memory 72, and a communication unit 73. Memory 72 stores, in addition to programs that are executed by processor 71, information that is used by the programs (such as maps, mathematical expressions, and various parameters). Processor 71 controls drive device 20.

Advertisement management server 330 includes a processor 331, a memory 332, and a communication unit 333. Memory 332 stores, in addition to programs that are executed by processor 331, information that is used by the programs (such as maps, mathematical expressions, and various parameters). Processor 331 controls communication unit 333. Communication unit 333 includes various communication I/Fs. Additionally, processor 331 is an example of the "controller" of the present disclosure.

Electrically powered vehicle 230 includes, in addition to battery 201 and navigation system 202, an ECU 233 and a communication device 234.

(Sequential Control of Display Control System)

Next, with reference to FIG. 14, sequential control of display control system 4 will be described. Additionally, steps in processes the same as those in the first to third embodiments will not be described in detail.

In processes in steps S91 to S95, same processes as in steps S1, S5, S11, S16, and S17 in the first embodiment are performed.

In step S96, electrically powered vehicle 230 (communication device 234) transmits, to each of advertisement management server 330 and battery station 130, a signal indicating reception of an operation for starting battery replacement.

In step S97, advertisement management server 330 (processor 331) detects performance of the operation for starting battery replacement, based on the signal acquired in response to the process in step S96.

In step S98, advertisement management server 330 (processor 331) performs control of displaying an advertisement on navigation system 202, in response to the process in step S97.

In step S99, battery station 130 (processor 71) detects performance of the operation for starting battery replacement, based on the signal acquired in response to the process in step S96.

In step S100, battery station 130 (processor 71) starts battery replacement control in response to the process in step S99.

In step S101, electrically powered vehicle 230 (ECU 233) causes navigation system 202 to display a notice regarding battery replacement, in response to the process in step S98.

In S102, electrically powered vehicle 230 (ECU 233) causes navigation system 202 to display the advertisement in response to the process in step S98.

Processes in steps S103 to S109 are the same as those in steps S49 to S55 in the second embodiment.

As described above, in the fourth embodiment, an advertisement is displayed on navigation system 202 in response to detection of performance, by the user, of the operation for starting battery replacement. The user is thereby able to view the advertisement during battery replacement.

Additionally, control in the first to fourth embodiments may be performed in combination. For example, in the first embodiment, an advertisement may be determined by using, instead of the user information, the information about battery 101 or the information about a facility in proximity of battery station 100. Furthermore, in the second embodiment, an advertisement may be determined by using, instead of the information about battery 101, the user information or the information about a facility in proximity of battery station 110. Furthermore, in the third embodiment, an advertisement may be determined by using, instead of the information about a facility in proximity of battery station 120, the user information or the information about battery 101. Moreover, in the fourth embodiment, an advertisement may be determined by using the user information, the information about battery 101, or the information about a facility in proximity of battery station 130. Moreover, in the first to third embodiments, an advertisement may be randomly determined without being determined based on predetermined information.

Moreover, in each of the first to fourth embodiments, a timing of displaying an advertisement and a timing of stopping advertisement display may be made the same as the timings in other embodiments as appropriate. Furthermore, the process in the second embodiment of simultaneously displaying an advertisement and button 202g (see FIG. 10) for starting battery replacement may be applied as appropriate to other embodiments.

In the first to fourth embodiments, an example where an advertisement is displayed on navigation system 202 is described, but the present disclosure is not limited to such an example. In the first embodiment, an advertisement may be displayed on mobile terminal 209 and monitor 30 provided on the outer wall of the battery station. In the second to fourth embodiments, an advertisement may be displayed on mobile terminal 209 and monitor 40 provided inside the battery station.

In the first to fourth embodiments, an example is described where display of an advertisement on navigation system 202 is started in response to performance of control of advertisement display, but the present disclosure is not limited to such an example. For example, an advertisement displayed on navigation system 202 may be switched to another advertisement in response to performance of the control mentioned above.

In the first to fourth embodiments, an example where an advertisement is displayed is described, but the present disclosure is not limited to such an example. For example, moving image contents such as a game or a movie may instead be displayed.

In the second to fourth embodiments, an example is described where an electrically powered vehicle is autonomously parked in the battery station, but the present disclosure is not limited to such an example. The electrically powered vehicle may be parked in the battery station by being driven by the user.

In the first to fourth embodiments, an example is described where the operation for starting battery replacement is performed on navigation system 202, but the present disclosure is not limited to such an example. The operation for starting battery replacement may be performed on mobile terminal 209 or monitor 40.

In the third embodiment, an example is described where entrance of electrically powered vehicle 220 into battery station 120 is detected based on an image from camera 170, but the present disclosure is not limited to such an example. For example, entrance of electrically powered vehicle 220 into battery station 120 may be detected based on a detection result from a sensor (such as a thermal detection sensor or a weight sensor) other than the camera. Furthermore, electrically powered vehicle 220 itself may detect entrance of electrically powered vehicle 220 into battery station 120.

In the first to fourth embodiments, an example is described where control of advertisement display is performed by the advertisement management server provided separately from the battery station, but the present disclosure is not limited to such an example. For example, a control device provided in the battery station may perform such control. Furthermore, the electrically powered vehicle may, by itself, detect performance of a predetermined process related to battery replacement and perform control of displaying (and of stopping) an advertisement, without performing communication with the battery station and the advertisement management server.

In the second embodiment, an example is described where an advertisement (predetermined video) and button 202g (selection portion) for starting battery replacement are displayed in response to completion of parking of electrically powered vehicle 210, and where the advertisement and button 202g are displayed on the same screen, but the present disclosure is not limited to such an example. For example, display of an advertisement may be started in response to autonomous parking being started, and button 202g may be displayed on the screen where the advertisement is displayed, in response to completion of autonomous parking.

Although embodiments of the present disclosure have been described, it is to be understood that the embodiments disclosed herein are by way of illustration and examples only and are not to be taken by way of limitation. The scope of the present disclosure is indicated by the appended claims, and is intended to include all modifications within the scope and meaning equivalent to those of the claims.

What is claimed is:

1. A display method comprising:

detecting performance of a predetermined process related to battery replacement in a battery replacement station including a battery that is to replace a battery of an electrically powered vehicle, the battery of the electrically powered vehicle being a first battery, the battery included in the battery replacement station being a second battery; and displaying a predetermined video on a display device in response to detection of performance of the predetermined process, the displaying facilitates viewing of the predetermined video during a process of the battery replacement.

2. The display method according to claim 1, wherein the detecting includes detecting performance, by a user of the electrically powered vehicle, of an operation for causing the electrically powered vehicle to be autonomously parked in the battery replacement station, and the displaying includes displaying the predetermined video on the display device in response to detection of performance, by the user, of the operation for causing the electrically powered vehicle to be autonomously parked in the battery replacement station.

3. The display method according to claim 2, further comprising:

detecting completion of autonomous parking of the electrically powered vehicle in the battery replacement station; and stopping display of the predetermined video on the display device in response to detection of completion of autonomous parking of the electrically powered vehicle in the battery replacement station.

4. The display method according to claim 1, wherein the detecting includes detecting completion of parking of the electrically powered vehicle in the battery replacement station, and the displaying includes starting display of the predetermined video on the display device in response to detection of completion of parking of the electrically powered vehicle in the battery replacement station.

5. The display method according to claim 4, wherein the displaying includes displaying the predetermined video and a selection portion that receives an operation for starting the battery replacement on a same screen on the display device, in response to detection of completion of parking of the electrically powered vehicle in the battery replacement station.

6. The display method according to claim 1, wherein the detecting includes detecting entrance of the electrically powered vehicle into the battery replacement station, and the displaying includes starting display of the predetermined video on the display device in response to detection of entrance of the electrically powered vehicle into the battery replacement station.

7. The display method according to claim 1, wherein the detecting includes detecting performance, by a user of the electrically powered vehicle, of an operation for starting the battery replacement, and the displaying includes starting display of the predetermined video on the display device in response to detection of performance, by the user, of the operation for starting the battery replacement.

8. The display method according to claim 1, further comprising displaying a notice regarding the battery replacement on the display device before the battery replacement is started, wherein the displaying includes displaying the predetermined video on the display device after the notice is displayed.

9. The display method according to claim 1, further comprising:

detecting completion of the battery replacement; and stopping display of the predetermined video on the display device in response to detection of completion of the battery replacement.

10. The display method according to claim 1, further comprising:

acquiring user information about a user of the electrically powered vehicle; and determining the predetermined video based on the user information.

11. The display method according to claim 1, further comprising determining the predetermined video based on information about the second battery.

12. The display method according to claim 1, wherein the displaying includes displaying, on the display device, an advertisement about a facility in proximity of the battery replacement station, based on position information of the battery replacement station.

13. A display control device comprising:

a communication unit that communicates with at least one of an electrically powered vehicle where a first battery is mounted, and a battery replacement station including a second battery that is to replace the first battery; and a controller that detects performance of a predetermined process related to battery replacement in the battery replacement station, and that performs control of causing a display device to display a predetermined video, in response to detection of performance of the predetermined process, the controller facilitates viewing of the predetermined video during a process of the battery replacement.

14. A display control system comprising:

a first processing device that performs a process of battery replacement in a battery replacement station including a battery that is to replace a battery of an electrically powered vehicle, the battery of the electrically powered vehicle being a first battery, the battery included in the battery replacement station being a second battery; and a second processing device that performs a process of displaying a predetermined video on a display device, wherein the second processing device performs the process of displaying a predetermined video on the display device, in a case where performance of a predetermined process by the first processing device is detected, the second processing device facilitates viewing of the predetermined video during a process of the battery replacement.

* * * * *